US010268780B2

(12) United States Patent
Albouyeh et al.

(10) Patent No.: US 10,268,780 B2
(45) Date of Patent: Apr. 23, 2019

(54) LEARNING HASHTAG RELEVANCE

(71) Applicant: International Business Machines Corporation, Armonk, NY (US)

(72) Inventors: Shadi E. Albouyeh, Raleigh, NC (US); James E. Fox, Apex, NC (US); Prasad L. Imandi, Chapel Hill, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 365 days.

(21) Appl. No.: 14/876,937

(22) Filed: Oct. 7, 2015

(65) Prior Publication Data

US 2017/0103071 A1 Apr. 13, 2017

(51) Int. Cl.

*G06F 17/00* (2006.01)
*G06F 17/30* (2006.01)
*G06Q 50/00* (2012.01)

(52) U.S. Cl.

CPC .. *G06F 17/30997* (2013.01); *G06F 17/30867* (2013.01)

(58) Field of Classification Search

CPC ........... G06F 17/3053; G06F 17/30997; G06F 17/30867; G06F 17/30017; G06N 5/02; H04L 67/22; H04L 51/32; G06Q 50/01

See application file for complete search history.

(56) References Cited

U.S. PATENT DOCUMENTS

| | | | | |
|---|---|---|---|---|
| 8,521,612 | B2 * | 8/2013 | Walker | G06Q 30/02 705/26.7 |
| 2013/0297581 | A1 | 11/2013 | Gosh et al. | |
| 2014/0019615 | A1 * | 1/2014 | Jennings | G06F 17/30144 709/224 |
| 2014/0372425 | A1 | 12/2014 | Ayoub et al. | |
| 2015/0066889 | A1 | 3/2015 | Bennett | |
| 2015/0120788 | A1 | 4/2015 | Brun et al. | |
| 2015/0348097 | A1 | 12/2015 | Andrianakou et al. | |
| 2016/0239870 | A1 * | 8/2016 | Mishra | G06Q 30/0257 |
| 2016/0328401 | A1 * | 11/2016 | Dhawan | G06F 17/30867 |
| 2017/0220556 | A1 | 8/2017 | Pasternack | |

* cited by examiner

*Primary Examiner* — Cheryl Lewis
(74) *Attorney, Agent, or Firm* — Cantor Colburn LLP; Michael O'Keefe

(57) ABSTRACT

In one aspect, a method for intelligently learning hashtag relevance may include monitoring, with a relevance engine, a target's access to a plurality of hashtag-annotated content comprising a first content, updating, using the relevance engine, an access record with information indicative of a number of times the target is presented with the first content and the first content remains unselected by the target, determining a relevance of the plurality of hashtag-annotated content based on the access record, and presenting a second hashtag-annotated content based on the relevance.

17 Claims, 4 Drawing Sheets

LEARNING HASHTAG RELEVANCE

BACKGROUND

The present disclosure relates to systems and methods for learning hashtag relevance, and more specifically, to a system and method for learning hashtag relevance with omission of disliked hashtags.

In social media and microblogging the adoption of using hashtags as metadata to index posts allows people to find like-minded topics or search for topics of interest. A hashtag is a type of label or metadata tag used on social network and microblogging services that make it easier for users to find messages with specific themes or content. Businesses and social media service providers often use hashtags to promote relevant content and eliminate irrelevant content and unwanted advertising. Users create and use hashtags by placing the hash character (or number sign "#") in front of a word or un-spaced phrase either in the main text of a message or at the end. The amount of data returned can often be overwhelming on search results from more generic or commonly used hashtags, resulting in a less relevant return of content to the end user. For example, searching a site such as Instagram for pictures of beaches with the hashtag annotation #beach can return a wide range of different topics, as additional hashtags that may or may not be of interest are also included in the search results presented to the user.

SUMMARY

According to some embodiments, a method for intelligently learning hashtag relevance is described. The computer-implemented method may include monitoring, with a relevance engine, an access of a target to a plurality of hashtag-annotated content items comprising a first content item, updating, using the relevance engine, an access record with information indicative of a number of times the target is presented with a first content item and the first content item remains unselected by the target, determining a relevance of the plurality of hashtag-annotated content items based on the access record, and presenting a second hashtag-annotated content item based on the relevance.

According to other embodiments, a system for intelligently learning hashtag relevance is described. The system may include a processor configured to monitor, with a relevance engine, an access of a target to a plurality of hashtag-annotated content comprising a first content items, update, using the relevance engine, an access record with information indicative of a number of times the target is presented with the first content item and the first content item remains unselected by the target, determine a relevance of the plurality of hashtag-annotated content items based on the access record, and present a second hashtag-annotated content item based on the relevance.

In yet other embodiments, a non-transitory computer-readable storage medium is described. The non-transitory computer-readable storage medium may be configured to store computer-executable instructions that cause a processor to perform a computer-implemented method. The computer-implemented method may include monitoring, with a relevance engine, an access of a target to a plurality of hashtag-annotated content items comprising a first content item, updating, using the relevance engine, an access record with information indicative of a number of times the target is presented with a first content item and the first content item remains unselected by the target, determining a relevance of the plurality of hashtag-annotated content items based on the access record, and presenting a second hashtag-annotated content item based on the relevance.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
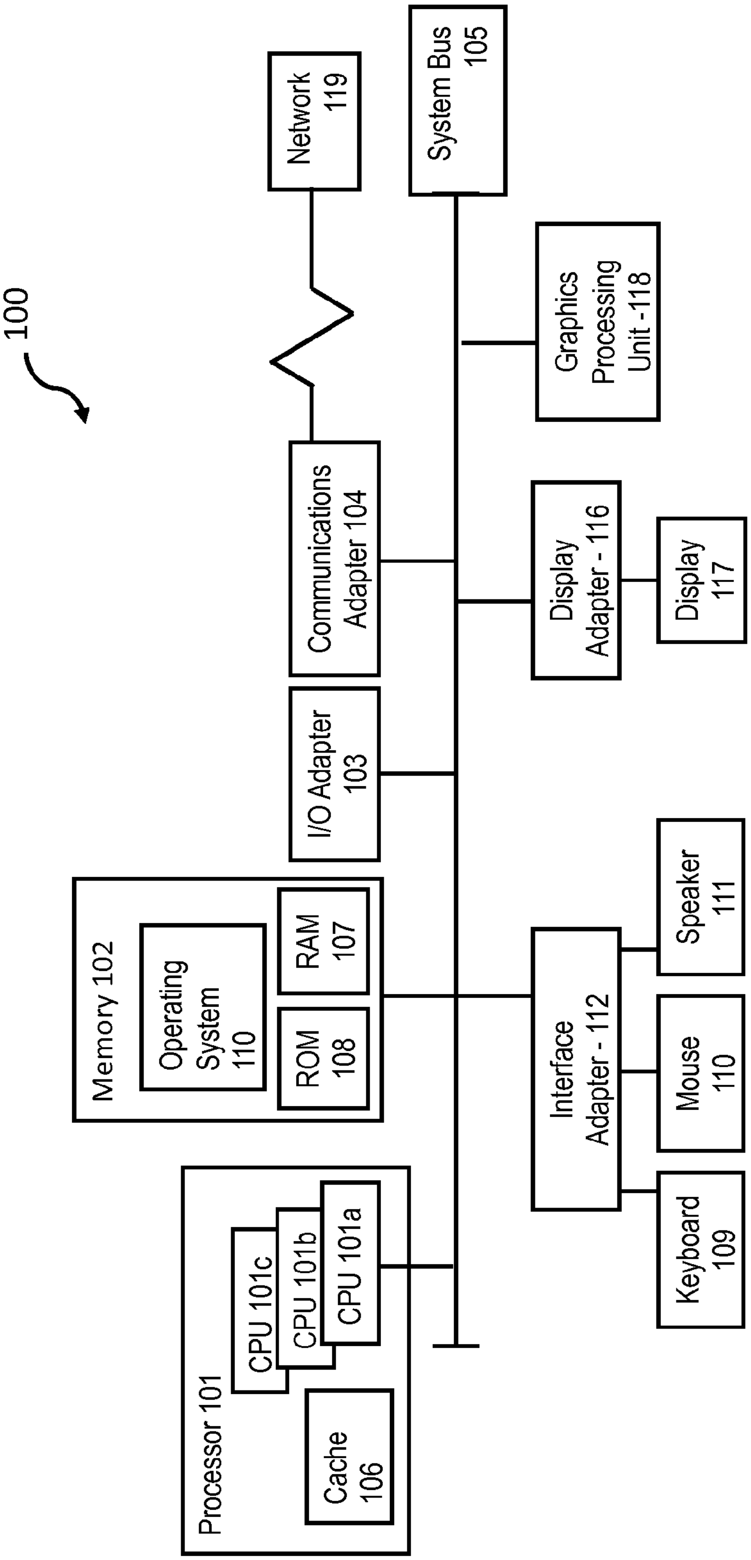
FIG. 1 illustrates a block diagram of a computer system for use in practicing the teachings herein.

FIG. 1 illustrates a block diagram of a computer system 100 (hereafter "computer 100") for use in practicing the embodiments described herein. The methods described herein can be implemented in hardware, software (e.g., firmware), or a combination thereof. In an exemplary embodiment, the methods described herein are implemented in hardware, and may be part of the microprocessor of a special or general-purpose digital computer, such as a personal computer, workstation, minicomputer, or mainframe computer. Computer 100 therefore can embody a general-purpose computer. In another exemplary embodiment, the methods described herein are implemented as part of a mobile device, such as, for example, a mobile phone, a personal data assistant (PDA), a tablet computer, etc.

In an exemplary embodiment, in terms of hardware architecture, as shown in FIG. 1, the computer 100 includes processor 101. Computer 100 also includes memory 102 coupled to processor 101, and one or more input and/or output (I/O) adaptors 103, that may be communicatively coupled via a local system bus 105. Memory 102 may be operatively coupled to one or more internal or external memory devices 109. Communications adaptor 104 may be operatively connect computer 100 to one or more networks 119. System bus 105 may also connect one or more user interfaces via interface adaptor 112. Interface adaptor 112 may connect a plurality of user interfaces to computer 100 including, for example, keyboard 109, mouse 110, speaker 111, etc. System bus 105 may also connect display adaptor 116 and display 117 to processor 101. Processor 101 may also be operatively connected to graphical processing unit 118.

Processor 101 is a hardware device for executing hardware instructions or software, particularly that stored in a non-transitory computer-readable memory (e.g., memory 102). Processor 101 can be any custom made or commercially available processor, a central processing unit (CPU), a plurality of CPUs, for example, CPU 101*a*-101*c*, an auxiliary processor among several other processors associated with the computer 101, a semiconductor based microprocessor (in the form of a microchip or chip set), a macroprocessor, or generally any device for executing instructions. Processor 101 can include a memory cache 106, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 106 may be organized as a hierarchy of more cache levels (L1, L2, etc.).

Memory 102 can include random access memory (RAM) 107 and read only memory (ROM) 108. RAM 107 can be any one or combination of volatile memory elements (e.g., DRAM, SRAM, SDRAM, etc.). ROM 108 can include any one or more nonvolatile memory elements (e.g., erasable programmable read only memory (EPROM), flash memory, electronically erasable programmable read only memory (EEPROM), programmable read only memory (PROM), tape, compact disc read only memory (CD-ROM), disk, cartridge, cassette or the like, etc.). Moreover, memory 102 may incorporate electronic, magnetic, optical, and/or other types of non-transitory computer-readable storage media. Note that the memory 102 can have a distributed architecture, where various components are situated remote from one another, but can be accessed by the processor 101.

The instructions in memory 102 may include one or more separate programs, each of which comprises an ordered listing of computer-executable instructions for implementing logical functions. In the example of FIG. 1, the instructions in memory 102 may include a suitable operating system 113. Operating system 110 can control the execution of other computer programs and provides scheduling, input-output control, file and data management, memory management, and communication control and related services.

Input/output adaptor 103 can be, for example but not limited to, one or more buses or other wired or wireless connections, as is known in the art. The input/output adaptor 103 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

Interface adaptor 112 may be configured to operatively connect one or more I/O devices to computer 100. For example, interface adaptor 112 may connect a conventional keyboard 109 and mouse 110. Other output devices, e.g., speaker 111 may be operatively connected to interface adaptor 112. Other output devices may also be included, although not shown. For example, devices may include but are not limited to a printer, a scanner, microphone, and/or the like. Finally, the I/O devices connectable to interface adaptor 112 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like.

Computer 100 can further include display adaptor 116 coupled to one or more displays 117. In an exemplary embodiment, computer 100 can further include communications adaptor 104 for coupling to a network 119.

Network 119 can be an IP-based network for communication between computer 100 and any external device. Network 119 transmits and receives data between computer 100 and external systems. In an exemplary embodiment, network 119 can be a managed IP network administered by a service provider. Network 119 may be implemented in a wireless fashion, e.g., using wireless protocols and technologies, such as WiFi, WiMax, etc. Network 119 can also be a packet-switched network such as a local area network, wide area network, metropolitan area network, Internet network, or other similar type of network environment. The network 119 may be a fixed wireless network, a wireless local area network (LAN), a wireless wide area network (WAN) a personal area network (PAN), a virtual private network (VPN), intranet or other suitable network system.

If computer 100 is a PC, workstation, laptop, tablet computer and/or the like, the instructions in the memory 102 may further include a basic input output system (BIOS) (omitted for simplicity). The BIOS is a set of essential routines that initialize and test hardware at startup, start operating system 113, and support the transfer of data among the operatively connected hardware devices. The BIOS is stored in ROM 108 so that the BIOS can be executed when computer 100 is activated. When computer 100 is in operation, processor 101 may be configured to execute instructions stored within the memory 102, to communicate data to and from the memory 102, and to generally control operations of the computer 100 pursuant to the instructions.

Hashtags are often used to index posts with respect to a particular subject matter of social media content. For example, a picture of a beach may be annotated with the hashtag annotations #beach, #paradise, #vacation, and #vacationpics. In some aspects, if a user has an interest in photos depicting "beach paradise," they may search the hashtag terms #beach and/or "#paradise," which may result in a presentation that includes the beach photo. If the user has an interest in the subject matter of the beach photo, they may select the post with the photograph of the beach from the results. However, other posts may also be presented to that user sharing the same index hashtag "#paradise." In some aspects, another person (e.g., a second user) may consider paradise to be an auto show of classic automobiles. Accordingly, the second user may post classic car photos from an auto show with the hashtag index "#paradise," but also may include tags "#CarHeaven," and "#autoshows." The first user searching for beach paradise-related posts may ignore the second user's post having classic automobile subject matter.

In some aspects, a need exists for a computer-implemented system for intelligently monitoring online actions of a user through an operatively connected user device that can observe the first user's online activities and intelligently make "like" and/or "dislike" determinations based on implications of the activities. The system may be configured to make these determinations with respect to each user, or with respect to a plurality of users. For example, if the first user routinely comes across subject matter having to do with classic automobiles but never selects the posts related to that subject, over time the computer-implemented system, which may be configured to intelligently monitor the first user's online activities, may determine that the first user has no interest, or even dislikes subject matter having to do with classic automobiles. The system may make similar determinations based on a one or a multitude of online users with a processor-implemented relevance engine configured to make intelligent determinations based on one or several observations of online activities. Accordingly, the system may conclude that the hashtags #CarHeaven and #autoshows are disliked or not of interest to that user.

As demonstrated above, it may be beneficial to provide computer-implemented systems and methods configured to intelligently monitor and record patterns by which hashtag-annotated content is disliked, which hashtag-annotated content is skipped, and which content is followed and/or liked.

In some aspects, the computer-implemented system may be configured to monitor online activities of one or more devices operated by a user and intelligently anticipate, based on the user actions, subject matter that the particular user dislikes without the user having to explicitly indicate that the subject matter is disliked. Accordingly, it may advantageous for the systems and methods to intelligently learn hashtag relevance with respect to a target, and identify patterns of potential "disliked" hashtags indicative that the content is less relevant to a user, and present the most relevant subject matter first.

Figure 2:
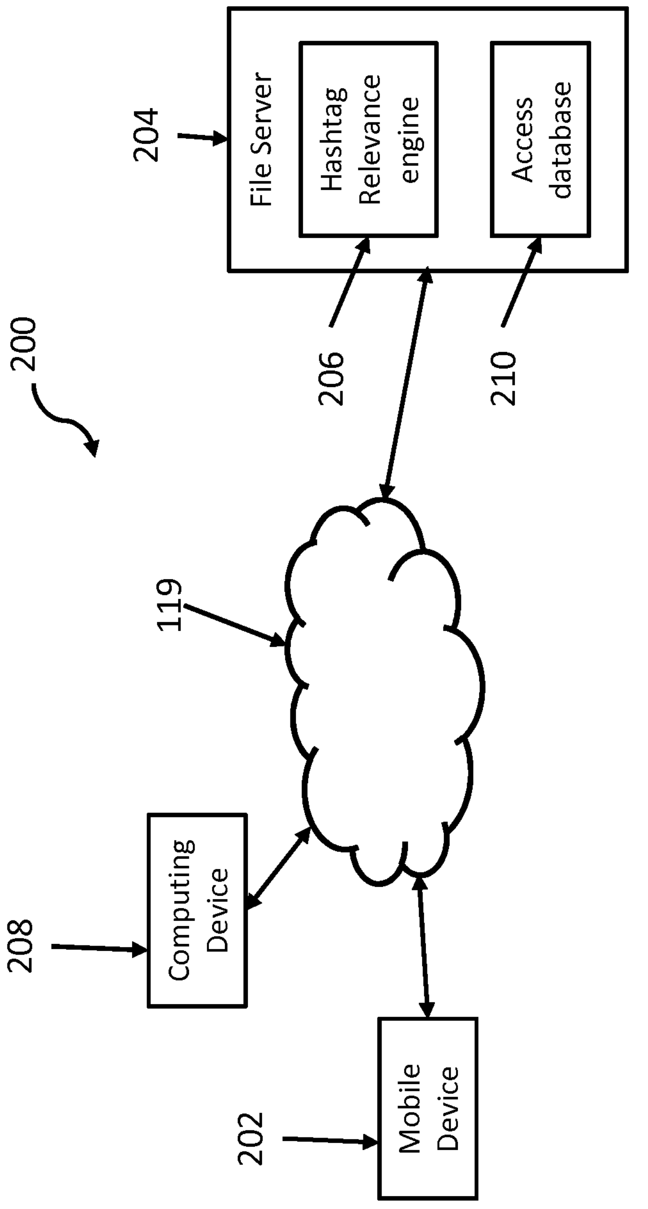
FIG. 2 depicts a computing environment for learning hashtag relevance with omission of disliked hashtags in accordance with an exemplary embodiment.

Referring now to FIG. 2, an exemplary computing environment 200 for learning hashtag relevance is depicted, according to some exemplary embodiments. Mobile device 202 may connect to one or more file servers (e.g., file server 204) delivering social media content having hashtag annotations. Device 202 may access file server 204 via network 119. Other computing devices (e.g., computing device 208) may also connect to file server 204 via network 119.

File server 204 may include a hashtag relevance engine 206, and an access database 210 having information in connection with access to hashtag-annotated content. Hashtag relevance engine 206 (hereafter relevance engine 206) may be an intelligence engine configured to perform one or more embodiments described herein via one or more processors (e.g., processor 101). Relevance engine 206 may embody hardware, software instructions, and/or a combination thereof. In exemplary embodiments, the relevance engine is software executing on a computer 100, as described above.

Figure 3:
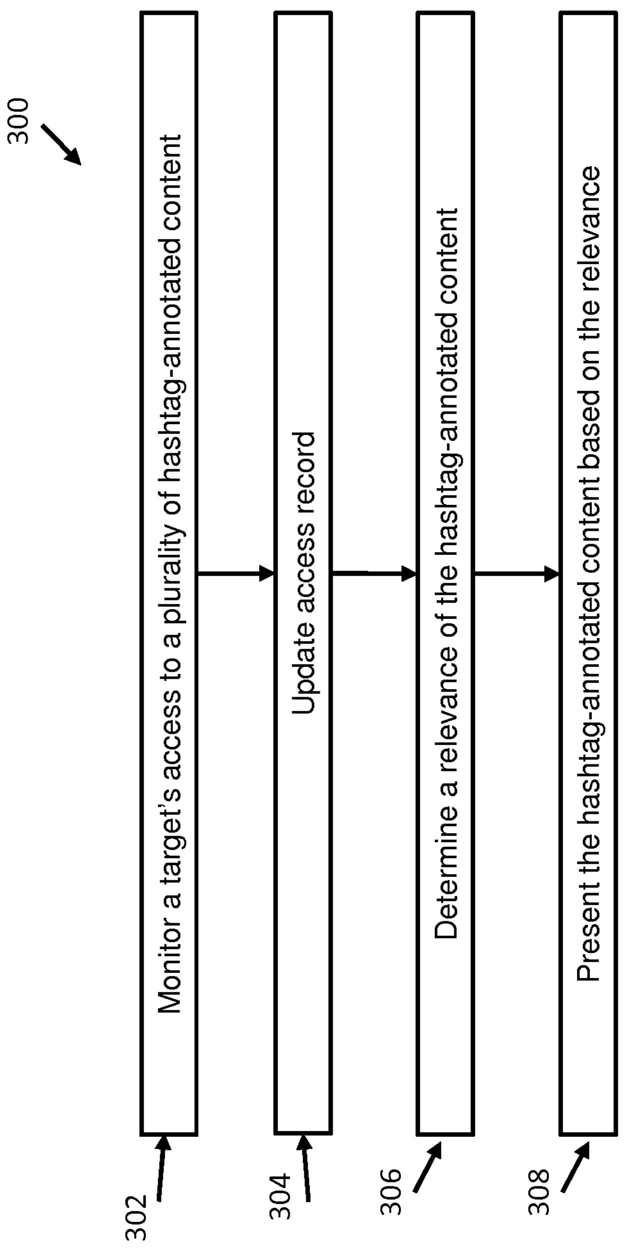
FIG. 3 depicts a flow diagram of a method for learning hashtag relevance with omission of disliked hashtags in accordance with an exemplary embodiment.

FIG. 3 depicts a flow diagram of a method 300 for learning hashtag relevance with omission of disliked hashtags, in accordance with an exemplary embodiment. Referring now to FIG. 3, as depicted at block 302, relevance engine 206 may monitor a target's access to a plurality of hashtag-annotated content. In some aspects, hashtag-annotated content may include one or more of a photograph, text, a digital video, a musical composition, a song, and/or other content having associated with it at least one hashtag annotation.

In some aspects, relevance engine 206 may monitor access to a plurality of hashtag-annotated content stored on one or more file servers remote from the device making the request. For example, device 202 may request access to a plurality of hashtag-annotated content (e.g., a group of photographs) from file server 204. File server 204 may store the hashtag-annotated content. In other aspects, device 202 may request access to a plurality of hashtag-annotated content, and a remote file server other than file server 204 may present the content. In some aspects, file server 204 may observe the information send from and received by device 202, and monitor the device's access to the plurality of hashtag-annotated content, although the content is stored and/or transmitted from a device that is not file server 204.

According to some embodiments, a target may be a user accessing hashtag-annotated content via a computing device (e.g., device 202 and/or device 208). In other aspects, a target may be a group of users, such as, for example, a household, a family, individuals associated with a business, etc. In yet other aspects, a target may be social media consumers using a particular social media website, or social media users as a whole, who may be accessing content delivered by a plurality of social media websites, where the content is indexed with hashtag annotations. A target may embody any one or more particular users monitored by the system of method 300.

Monitoring a target's access to a plurality of hashtag-annotated may include monitoring traffic to and from a particular server, and/or a group of servers that may store and transmit hashtag-annotated content. For example, file server 204 may store the content, or store only information indicative of access to the content (e.g., access database 210). In some aspects, relevance engine 206 may uniquely identify a target such that the target's access to the content is observable by relevance engine 206.

In other embodiments, the access may be made from a single device at one period of time (e.g., on device 202 during a single duration of 20 minutes of access). In other aspects, access made from one or more devices (e.g., device 202 and device 208) during a plurality of periods of time (e.g., once on device 202 for a period of 10 minutes, another time on device 208 for a period of one hour, etc.).

As shown at block 302, in some embodiments, relevance engine 206 may monitor the target and observe patterns in the target's access of the content. For example, over time, relevance engine 206 may observe that the target routinely ignores (e.g., does not select or otherwise show interest in) certain hashtag indexes. In other embodiments, relevance engine 206 may observe that the target is presented with content having a certain hashtag, and the target does not select it after having been presented the content in a plurality of contexts at a plurality of times. For example, if content annotated with #ClassicCars has been presented to a particular target a counted number of times, with various search contexts or terms that all returned the annotated content #ClassicCars, relevance engine 206 may keep track of the count in access database 210.

As shown at block 304, relevance engine 206 may update an access record with information indicative of a number of times the target is presented with the first content and the first content remains unselected by the target. The access record may be stored, for example, in access database 210. In some aspects, access database may include information indicative of a number of times a particular target is presented with the first content and the first content remains unselected by the target. In other aspects, relevance engine 206 may monitor a plurality of targets and track the targets' access to the hashtag-annotated content in access database 210.

Figure 4:
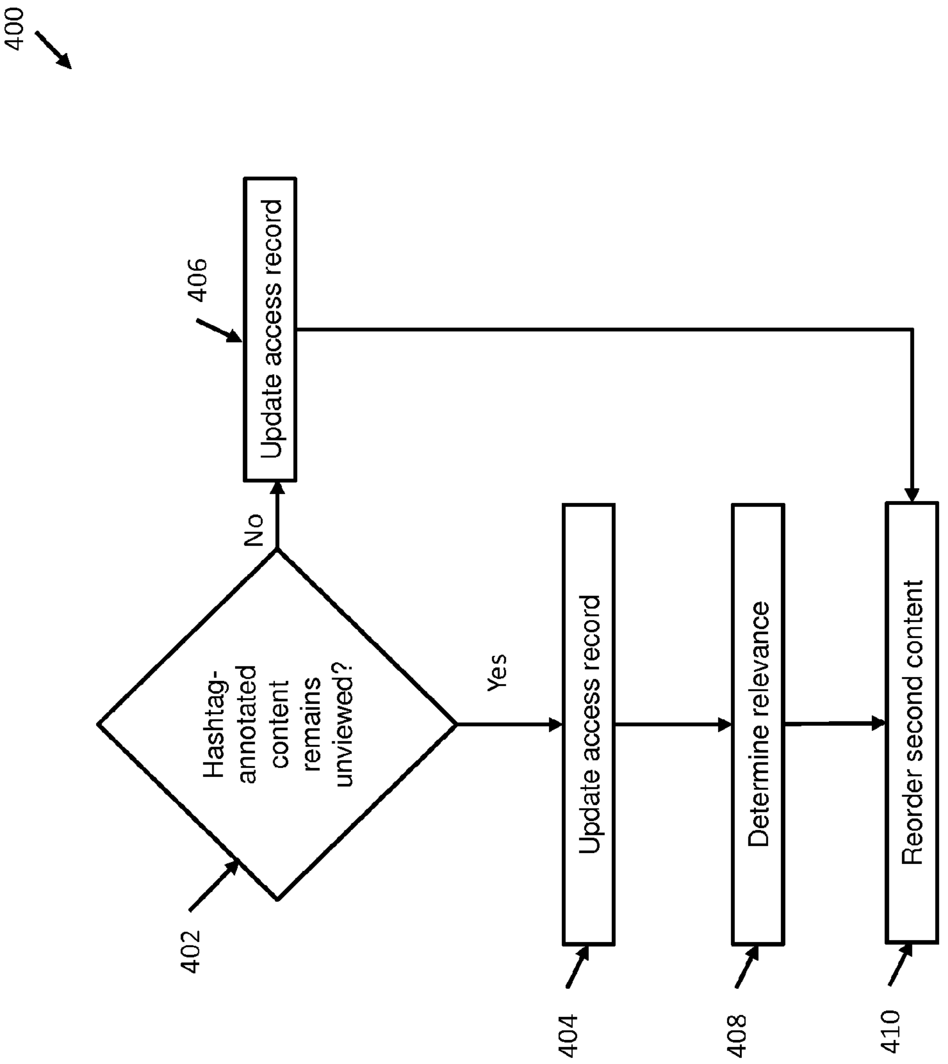
FIG. 4 depicts a flow diagram of a method for determining a relevance of hashtag-annotated content in accordance with an exemplary embodiment.

As shown in block 306, relevance engine 206 may determine a relevance of the hashtag-annotated content based on the access record stored in access database 210. FIG. 4 depicts a flow diagram of a method 400 for determining a relevance of hashtag-annotated content, in accordance with an exemplary embodiment.

Referring now to FIG. 4, as shown in decision block 402, relevance engine 206 may determine if hashtag-annotated content presented to the target at an earlier time is again unselected by the target. For example, in one aspect, a target may be a single user. The user may access a social media site (e.g., www.instagram.com, or another social media site having access to hashtag-annotated content) using a computing device (e.g., computing device 208). In some aspects, relevance engine 206 may monitor data transmission to and from computing device 208, and observe that device 208 requests content having annotations #beach from a social media provider. Relevance engine 206 may observe that the social media provider returns the following hashtag-annotated content (e.g., photographs, etc.):

1) An image of some legs, the image having the annotations #fun #instagrammers #food #smile #selfie #pretty #followme #lol #hot #swag #beach #cool #yolo;

2) An image of a heron on the beach, the image having the annotations #beach #prettybird #florida #nature #sunset;
3) An image of rocks balanced on the beach, the image having the annotations #beach #oceanside #rock;
4) An image of the back of a Ferrari, the image having the annotations #ferrari #italia #swag #yolo #beach #morningoctane;
5) An image of an alleyway, the image having the annotations #girls #yolo #swag #throwbackthursday #art #party #followback #followme;
6) An image of a selfie, the image having the annotations #sky #girls #tagsforlikes #followforfollow #beach #selfie #boyfriend #yolo #art #instagrammers #followme;
7) An image of another selfie, the image having the annotations #sky #girls #tagsforlikes #night #beach #photo #art #swag #yolo #beauty #selfie;
8) An image of a mountain, the image having the annotations #mountain #beach #follow4follow #girl #art;
9) An image of another selfie (at the beach), the image having the annotations #beach #selfie #girl;
10) An image of a beach at sunset, the image having the annotations #wave #beach #nature #spain #sunset;
11) An image of a bowl of candy, the image having the annotations #sky #girls #tagsforlikes #followforfollow #beach #boyfriend #yolo #art #instagrammers #followme; and
12) An image of a selfie, the image having the annotations #fun #swag #tagforlikes #pretty #smile #followme #onedirection #cool #selfie.

In some aspects, the user may be looking for beach photos, and have varying degrees of disinterest in the non-related search results (not related to beach photographs). The user may "like" some results (by selecting, opening, activating a "like" feature, etc., and ignore other results. As the user "likes" the images that are relevant, relevance engine 206 may develop a profile based on what was liked.

Relevance engine 206 may also develop the profile based on what was not liked by that user. For example, if the user liked search posts returned from the search results with #sunset and #nature in common on this search, at decision block 402, relevance engine 206 may determine if hashtag-annotated content has been repeatedly presented to that user, and the content remains unselected by the user. As shown at block 406, relevance engine may determine that there is no information presented in the search results that remains unselected. Accordingly, relevance engine may update the access record that records information indicative of the number of times the target is presented with the particular content annotated with the hashtags #nature and #sunset, and the user selected or liked the content. As shown at block 410, relevance engine 206 may reorder subsequent search results according to the liked content (e.g., by placing the liked subject matter at a prominent position in the search results).

In other aspects, the user may not like hashtag-annotated content having the hashtags #fun #followme #pretty #yolo #swag #followforfollow #sky #girls #girl #tagsforlikes #selfie in common. According to some embodiments, as seen at decision block 402, relevance engine 206 may determine that particular target "dislikes" subject matter based on the unselected or disliked hashtag-annotated content based on a number of times the content has been presented and remains unselected by that target.

For example, as the user continues to search on different topics, the number of instances where #nature and #sunset are liked may increase. At the same time, relevance engine 206 may determine that images and/or other content with #yolo #swag #swag are disliked liked and/or never selected by this particular user. In some aspects, as shown in block 404, relevance engine 206 may update access database 210 with information indicative of a number of times the target is presented with the first content and the first content remains unselected by the target.

As relevance engine 206 develops a profile with respect to a particular target, it may learn that that particular target has skipped over and never liked or viewed an image with the hashtags #selfie #yolo or #swag. Accordingly, relevance engine 206 may designate these hashtags into a "disliked" category based on the observation from access database 210. For example, after a predetermined threshold of times that search results containing potentially disliked hashtags are presented to the particular target (e.g., 50 one or more particular hashtags are presented and either unselected or disliked by that target), at block 404 relevance engine 206 may record the number of times presented. Accordingly, in some embodiments, at block 408, relevance engine 206 may determine a relevance of the plurality of hashtag-annotated content based on access database 210. In some aspects, relevance engine 206 may present new search results (e.g., results having images) with hashtag-annotated content having one of the disliked hashtags either moved to a lower position in the search results or removed altogether. As depicted at block 410, relevance engine 206 may reorder the content based on the access database, and present new content accordingly.

Referring again to FIG. 3, after determining a relevance of the hashtag-annotated content as seen at block 306, in some aspects, at block 308 relevance engine 206 may present the hashtag-annotated content based on the relevance. Accordingly, with the systems and methods described herein relevance engine 206 may provide a more relevant search experience for a user or group of users.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a wave-guide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for intelligently learning hashtag relevance comprising:

monitoring, with a relevance engine, an access of a target to a plurality of hashtag-annotated content comprising a first hashtag-annotated content and a second hashtag-annotated content;

counting, using the relevance engine, a number of times the target is presented with the first hashtag-annotated content and a number of times the first hashtag-annotated content remains unselected by the target;

updating, using the relevance engine, an access record with a value indicative of the number of times the first hashtag-annotated content remains unselected by the target;

counting, using the relevance engine, a number of times the target is presented with the first hashtag-annotated content and a number of times the first hashtag-annotated content is selected by the target;

updating, using the relevance engine, an access record with a value indicative of the number of times the first hashtag-annotated content is selected by the target;

counting, using the relevance engine, a number of times the target is presented with the second hashtag-annotated content and a number of times the second hashtag-annotated content remains unselected by the target;

updating, using the relevance engine, an access record with a value indicative of the number of times the second hashtag-annotated content remains unselected by the target;

counting, using the relevance engine, a number of times the target is presented with the second hashtag-annotated content and a number of times the second hashtag-annotated content is selected by the target;

updating, using the relevance engine, an access record with a value indicative of the number of times the second hashtag-annotated content is selected by the target;

determining a relevance of the first and second hashtag-annotated content based on the values stored in the access record; and presenting the first and second hashtag-annotated content into a determined order based on the relevance.

2. The computer-implemented method of claim 1, further comprising:

monitoring, with the relevance engine, a plurality of accesses to the plurality of hashtag-annotated content by the target; and updating the access record after each access.

3. The computer-implemented method of claim 1, wherein presenting the second hashtag-annotated content comprises inhibiting at least one hashtag-annotated content having at least one hashtag annotation in common with an unselected hashtag-annotated content.

4. The computer-implemented method of claim 1, wherein the determined order is biased away from the unselected hashtag-annotated content.

5. The computer-implemented method of claim 1, wherein the relevance engine determines whether the target dislikes the hashtag-annotated content based on the access record.

6. The computer-implemented method of claim 5, further comprising removing a disliked hashtag-annotated content with the relevance engine.

7. An information processing system for intelligently learning hashtag relevance comprising:

a memory;

a processing unit communicatively coupled to the memory, wherein the processing unit is configured to:

monitor, with a relevance engine, an access of a target to a plurality of hashtag-annotated content comprising a first hashtag-annotated content and a second hashtag-annotated content;

count, using the relevance engine, a number of times the target is presented with the first hashtag-annotated content and a number of times the first hashtag-annotated content remains unselected by the target;

update, using the relevance engine, an access record with a value indicative of the number of times the first hashtag-annotated content remains unselected by the target;

count, using the relevance engine, a number of times the target is presented with the first hashtag-annotated content and a number of times the first hashtag-annotated content is selected by the target;

update, using the relevance engine, an access record with a value indicative of the number of times the first hashtag-annotated content is selected by the target;

count, using the relevance engine, a number of times the target is presented with the second hashtag-annotated content and a number of times the second hashtag-annotated content remains unselected by the target;

update, using the relevance engine, an access record with a value indicative of the number of times the second hashtag-annotated content remains unselected by the target;

count, using the relevance engine, a number of times the target is presented with the second hashtag-annotated content and a number of times the second hashtag-annotated content is selected by the target;

update, using the relevance engine, an access record with a value indicative of the number of times the second hashtag-annotated content is selected by the target;

determine a relevance of the first and second hashtag-annotated content based on the values stored in the access record; and present the first and second hashtag-annotated content into a determined order based on the relevance.

8. The information processing system of claim 7, wherein the processing unit is further configured to:

monitor, with the relevance engine, a plurality of accesses to the plurality of hashtag-annotated content by the target; and update the access record after each access.

9. The information processing system of claim 7, wherein the processing unit is configured to present the second hashtag-annotated content by inhibiting at least one hashtag-annotated content having at least one hashtag annotation in common with an unselected hashtag-annotated content.

10. The information processing system of claim 7, wherein the determined order is biased away from the unselected hashtag-annotated content.

11. The information processing system of claim 7, wherein the processing unit is further configured to determine whether the target dislikes the hashtag-annotated content based on the access record.

12. The information processing system of claim 11, wherein the processing unit is further configured to remove a disliked hashtag-annotated content with the relevance engine.

13. A non-transitory computer-readable storage medium storing computer-executable instructions that cause a processor to perform a computer-implemented method, the method comprising:

monitoring, with a relevance engine, an access of a target to a plurality of hashtag-annotated content comprising a first hashtag-annotated content and a second hashtag-annotated content;

counting, using the relevance engine, a number of times the target is presented with the first hashtag-annotated content and a number of times the first hashtag-annotated content remains unselected by the target;

updating, using the relevance engine, an access record with a value indicative of the number of times the first hashtag-annotated content remains unselected by the target;

counting, using the relevance engine, a number of times the target is presented with the first hashtag-annotated content and a number of times the first hashtag-annotated content is selected by the target;

updating, using the relevance engine, an access record with a value indicative of the number of times the first hashtag-annotated content is selected by the target;

counting, using the relevance engine, a number of times the target is presented with the second hashtag-annotated content and a number of times the second hashtag-annotated content remains unselected by the target;

updating, using the relevance engine, an access record with a value indicative of the number of times the second hashtag-annotated content remains unselected by the target;

counting, using the relevance engine, a number of times the target is presented with the second hashtag-annotated content and a number of times the second hashtag-annotated content is selected by the target;

updating, using the relevance engine, an access record with a value indicative of the number of times the second hashtag-annotated content is selected by the target;

determining a relevance of the first and second hashtag-annotated content based on the values stored in the access record; and presenting the first and second hashtag-annotated content into a determined order based on the relevance.

14. The non-transitory computer-readable storage medium of claim 13, further comprising:

monitoring, with the relevance engine, a plurality of accesses to the plurality of hashtag-annotated content by the target; and updating the access record after each access.

15. The non-transitory computer-readable storage medium of claim 14, wherein the relevance engine determines whether the target dislikes the hashtag-annotated content based on the access record.

16. The non-transitory computer-readable storage medium of claim 13, wherein presenting the second hashtag-annotated content comprises inhibiting at least one hashtag-annotated content having at least one hashtag annotation in common with an unselected hashtag-annotated content.

17. The non-transitory computer-readable storage medium of claim 13, wherein the determined order is biased away from the unselected hashtag-annotated content.

* * * * *